United States Patent
Furukawa (10) Patent No.: US 9,913,060 B2
(45) Date of Patent: Mar. 6, 2018

(54) STEREO REPRODUCTION APPARATUS

(71) Applicant: Panasonic Intellectual Property Corporation of America, Torrance, CA (US)

(72) Inventor: Hiroki Furukawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 15/471,003

(22) Filed: Mar. 28, 2017

(65) Prior Publication Data

US 2017/0295444 A1    Oct. 12, 2017

(30) Foreign Application Priority Data

Apr. 12, 2016  (JP) ................................. 2016-079466

(51) Int. Cl.
*H04H 40/72*    (2008.01)
*H04S 1/00*    (2006.01)

(52) U.S. Cl.
CPC ............ *H04S 1/002* (2013.01); *H04H 40/72* (2013.01); *H04S 2420/07* (2013.01)

(58) Field of Classification Search
CPC ...... H04H 40/72; H04S 1/002; H04S 2420/07

USPC ..................................................... 381/2–3, 13
See application file for complete search history.

(56) References Cited

U.S. PATENT DOCUMENTS 8,891,778 B2 * 11/2014 Brown ................ G10L 21/0208
381/103
9,172,479 B2 * 10/2015 Gautama ................ H04H 20/89
9,374,117 B2 * 6/2016 Gierl .................... H04B 1/1676

FOREIGN PATENT DOCUMENTS

JP    2014-146942    8/2014

* cited by examiner

*Primary Examiner* — Disler Paul
(74) *Attorney, Agent, or Firm* — Greenblum & Bernstein, P.L.C.

(57) ABSTRACT

A right expected value generator generates an expected value of a right channel spectrum from the right channel spectrum. Further, a left expected value generator generates an expected value of a left channel spectrum from the left channel spectrum. Further, a right channel spectrum corrector so corrects a right channel spectrum outputted from a second synthesizer that the right channel spectrum does not exceed the expected value of the right channel spectrum. Moreover, a left channel spectrum corrector so corrects a left channel spectrum outputted from the second synthesizer that the left channel spectrum does not exceed the expected value of the left channel spectrum.

8 Claims, 8 Drawing Sheets

STEREO REPRODUCTION APPARATUS

BACKGROUND

1. Technical Field

The present disclosure relates to a stereo reproduction apparatus in an FM stereo receiver.

2. Description of the Related Art

In extracting a left channel signal and a right channel signal from a stereo sum signal and a stereo difference signal in a stereo reproduction apparatus, it is desirable to reduce noise while maintaining stereo balance between the signals. To this end, Japanese Unexamined Patent Application Publication No. 2014-146942 discloses a technique for estimating noise components contained in a stereo sum signal and a stereo difference signal, respectively, eliminating, from the stereo sum signal and the stereo difference signal, the noise components thus estimated, and generating left and right channel signals from the stereo sum signal and the stereo difference signal from which the noise components have been eliminated.

Japanese Unexamined Patent Application Publication No. 2014-146942 employs non-linear processing such as a spectral subtraction method in eliminating estimated noise components. While the non-linear processing is highly effective in eliminating noise, it imparts distortions to signal components contained in a stereo sum signal and in a stereo difference signal and undesirably invites deterioration in separation and sound quality. In particular, the distortions of the signal components increase under a situation with a low receiving electric-field strength. Therefore, Japanese Unexamined Patent Application Publication No. 2014-146942 undesirably invites deterioration in separation and sound quality under a situation with a low receiving electric-field strength.

SUMMARY

One non-limiting and exemplary embodiment provides a stereo reproduction apparatus that suppresses deterioration in separation and sound quality even under a situation with a low receiving electric-field strength.

In one general aspect, the techniques disclosed here feature a stereo reproduction apparatus for reproducing an FM stereo signal containing a stereo sum signal and a stereo difference signal, the stereo reproduction apparatus including: a processor; and a memory storing therein a computer program, which when executed by the processor, causes the processor to perform operations including: converting the stereo sum signal from a time domain into a frequency domain; converting the stereo difference signal from a time domain into a frequency domain; eliminating a noise component from the stereo difference signal thus converted; combining the stereo sum signal thus converted and the stereo difference signal thus converted and outputting left and right channel spectra; generating expected values of the left and right channel spectra from the left and right channel spectra, respectively; combining the stereo sum signal thus converted and the stereo difference signal from which the noise component has been eliminated and outputting the left and right channel spectra from which the noise component has been eliminated; so correcting the left channel spectrum from which the noise component has been eliminated that the left channel spectrum does not exceed the expected value of the left channel spectrum; so correcting the right channel spectrum from which the noise component has been eliminated that the right channel spectrum does not exceed the expected value of the right channel spectrum; reverse-converting the left channel spectrum thus corrected from the frequency domain into the time domain; and reverse-converting the right channel spectrum thus corrected from the frequency domain into the time domain.

The present disclosure makes it possible to suppress deterioration in separation and sound quality even under a situation with a low receiving electric-field strength.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Underlying Knowledge Forming Basis of the Present Disclosure

Figure 8:
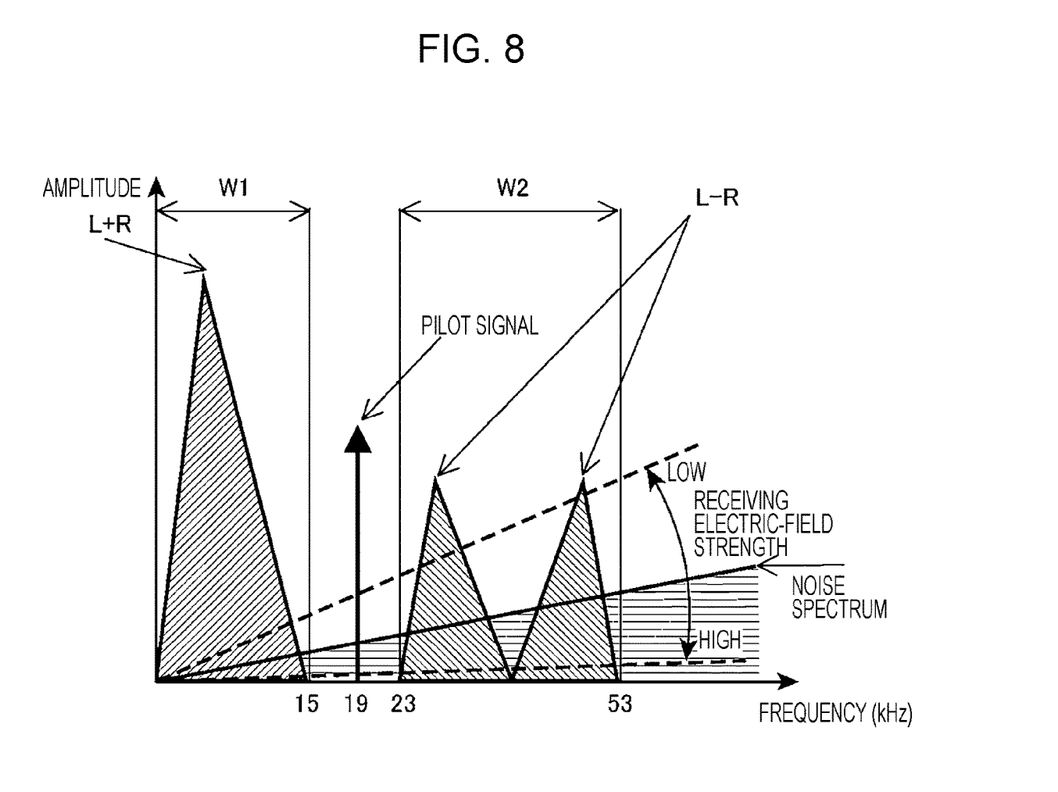
FIG. 8 is a diagram simulatively showing the spectrum of an AM-FM scheme FM stereo composite signal.

An FM stereo receiver rises in noise level of reproduced sound with decrease in receiving electric-field strength. FIG. 8 is a diagram simulatively showing the spectrum of an AM-FM scheme FM stereo composite signal. In FIG. 8, a stereo sum signal L+R is allocated to a bandwidth W1 of 0 to 15 kHz, and a stereo difference signal L−R AM-modulated by a 38-kHz carrier is allocated to a bandwidth of 23 to 53 kHz. Further, FIG. 8 shows an example of a noise spectrum as a function of frequency. The noise spectrum tends to be higher in power with increase in frequency. Further, the noise spectrum tends to increase in inclination with decrease in receiving electric-field strength.

Consequently, the stereo difference signal L−R, allocated to the bandwidth W2, becomes higher in percentage of noise than the stereo sum signal L+R with decrease in receiving electric-field strength, thus grating on a listener's ears. For this reason, at such a receiving electric-field strength that the noise of the stereo difference signal L−R grates on the listener's ears, a method is often used in which the stereo difference signal L−R is not used and only the stereo sum signal L+R is reproduced as a monophonic signal.

In particular, in the case of an on-vehicle FM stereo receiver that is mounted on a vehicle, there are always fluctuations in receiving electric-field strength, as the vehicle moves at high speeds. Consequently, when the above technique is applied to the on-vehicle FM stereo receiver, the fluctuations in receiving electric-field strength cause frequent switching between stereo with more sound coming out and monaural with less sound coming out, thus bringing a feeling of strangeness to the listener.

To address this problem, Japanese Unexamined Patent Application Publication No. 2014-146942 discloses a technique for estimating noise components contained in a stereo sum signal and a stereo difference signal, respectively, eliminating, from the stereo sum signal and the stereo difference signal, the noise components thus estimated, and generating left and right channel signals from the stereo sum signal and the stereo difference signal from which the noise components have been eliminated.

However, in order to maintain stereo reproduction by eliminating noise from the stereo difference signal L−R so that the stereo difference signal L−R has the same level of SN ratio as the stereo sum signal L+R, it is necessary to eliminate noise from the stereo difference signal L−R by a noise suppression amount of not less than 20 dB. In general, noise elimination is achieved through signal processing such as a spectral subtraction method or a Wiener filter. It should be noted that Japanese Unexamined Patent Application Publication No. 2014-146942 employs a spectral subtraction method to achieve noise elimination. These types of signal processing, which fall under the category of non-linear processing, are highly effective in eliminating noise. Therefore, when such signal processing with a high noise elimination effect is performed on a stereo difference signal with a low receiving electric-field strength and a low SN ratio, the noise elimination effect affect not only the noise components but also a signal component contained in the stereo difference signal L−R. This causes the signal component to become distorted, thus lowering sound quality.

Usually, as a method for generating a left channel spectrum L and a right channel spectrum R from a stereo sum signal L+R and a stereo difference signal L−R, a method of adding and subtracting the stereo sum signal L+R and the stereo difference signal L−R is used.

The left channel spectrum L is obtained by adding the stereo sum signal L+R and the stereo difference signal L−R as follows: $L=\frac{1}{2}\times\{(L+R)+(L-R)\}$. At this point in time, the right channel spectrum R contained in the stereo sum signal L+R is canceled out by the reversed-phase right channel spectrum (−R) contained in the stereo difference signal L−R, with the result that only the left channel spectrum L is obtained.

The right channel spectrum R is obtained by subtracting the stereo difference signal L−R from the stereo sum signal L+R as follows: $R=\frac{1}{2}\times\{(L+R)-(L-R)\}$. At this point in time, the left channel spectrum L contained in the stereo sum signal L+R is canceled out by subtracting the left channel spectrum L contained in the stereo difference signal L−R, with the result that only the right channel spectrum R is obtained.

Consideration is given here to a process by which the above non-linear signal processing is applied to the stereo difference signal L−R and the left and right channel spectra L and R are generated by adding and subtracting the stereo difference signal L−R and the stereo sum signal L+R from which noise has been eliminated.

In the case of generating the left channel spectrum L in this process, when the signal component contained in the stereo difference signal L−R is distorted by noise elimination, the right channel spectrum R is not sufficiently canceled out, with the result that the distortion of the right channel spectrum R remains in the left channel spectrum L.

Similarly, in the case of generating the right channel spectrum R in this process, when the signal component contained in the stereo difference signal L−R is distorted by noise elimination, the distortion of the left channel spectrum L remains in the right channel spectrum R.

Thus, when the signal component of the stereo difference signal L−R becomes distorted by noise elimination, distortions are added to the left and right channel spectra L and R, with the result that the left and right channel spectra L and R become higher than their original levels. This undesirably causes deterioration in separation between and in sound quality of the left and right channel spectra L and R.

To address this problem, the present disclosure provides a stereo reproduction apparatus that suppresses deterioration in separation and sound quality even under a situation with a low receiving electric-field strength.

A stereo reproduction apparatus according to a first aspect of the present disclosure is a stereo reproduction apparatus for reproducing an FM stereo signal containing a stereo sum signal and a stereo difference signal, the stereo reproduction apparatus including:

a processor; and a memory storing therein a computer program, which when executed by the processor, causes the processor to perform operations including:

converting the stereo sum signal from a time domain into a frequency domain;

converting the stereo difference signal from a time domain into a frequency domain;

eliminating a noise component from the stereo difference signal thus converted;

combining the stereo sum signal thus converted and the stereo difference signal thus converted and outputting left and right channel spectra;

generating expected values of the left and right channel spectra from the left and right channel spectra, respectively;

combining the stereo sum signal thus converted and the stereo difference signal from which the noise component has been eliminated and outputting the left and right channel spectra from which the noise component has been eliminated;

so correcting the left channel spectrum from which the noise component has been eliminated that the left channel spectrum does not exceed the expected value of the left channel spectrum;

so correcting the right channel spectrum from which the noise component has been eliminated that the right channel spectrum does not exceed the expected value of the right channel spectrum;

reverse-converting the left channel spectrum thus corrected from the frequency domain into the time domain; and reverse-converting the right channel spectrum thus corrected from the frequency domain into the time domain.

Under such a situation where the FM stereo signal has a low receiving electric-field strength and the stereo difference signal has a low SN ratio, the elimination of a noise component from the stereo difference signal may affect a signal component, with the result that signal components contained in the stereo difference signal and in the stereo sum signal may no longer coincide with each other. Therefore, in a case where the left channel spectrum is extracted by combining the stereo difference signal and the stereo sum signal, the right channel spectrum remains without being successfully canceled out, and the remaining right channel spectrum is added to the left channel spectrum, with the result that the power of the left channel spectrum may become higher than the original power. Further, also in a case where the right channel spectrum extracted by combining the stereo difference signal and the stereo sum signal, the power of the right channel spectrum may become higher than the original level for a similar reason.

To address this problem, the present aspect generates the expected values of the right and left channel spectra from the right and left channel spectra, respectively, generated on the basis of the stereo difference signal from which the noise component is yet to be eliminated. Then, the right and left channel spectra generated on the basis of the stereo difference signal from which noise has been eliminated are corrected so as not to exceed the expected values, respectively. This restricts the left and right channel spectra from exceeding the expected values and prevents the right and left channel spectra from exceeding their original levels.

Then, the left and right channel spectra thus corrected are reverse-converted from the frequency domain into the time domain, whereby left and right channel signals are generated. This prevents the right and left channel signals from exceeding their original levels and makes it possible to suppress deterioration in separation and sound quality even under a situation with a low receiving electric-field strength.

A stereo reproduction apparatus according to a second aspect of the present disclosure is a stereo reproduction apparatus for reproducing an FM stereo signal containing a stereo sum signal and a stereo difference signal, the stereo reproduction apparatus including:

a processor; and a memory storing therein a computer program, which when executed by the processor, causes the processor to perform operations including:

converting the stereo sum signal from a time domain into a frequency domain;

converting the stereo difference signal from a time domain into a frequency domain;

eliminating a noise component from the stereo difference signal thus converted;

combining the stereo sum signal thus converted and the stereo difference signal thus converted and outputting left and right channel spectra;

generating expected values of the left and right channel spectra from the left and right channel spectra, respectively;

combining the stereo sum signal thus converted and the stereo difference signal from which the noise component has been eliminated and outputting the left and right channel spectra from which the noise component has been eliminated;

so correcting the left channel spectrum from which the noise component has been eliminated that the left channel spectrum does not exceed the expected value of the left channel spectrum;

so correcting the right channel spectrum from which the noise component has been eliminated that the right channel spectrum does not exceed the expected value of the right channel spectrum;

subjecting the left and right channel spectra thus corrected to low-pass processes with a low-pass characteristic according to a receiving electric-field strength of the FM stereo signal, subjecting the stereo sum signal thus converted to a high-pass process with a high-pass characteristic according to the receiving electric-field strength so that reductions in the left and right channel spectra due to the low-pass processes are complemented, and adding, to the left and right channel spectra finished with the low-pass processes, the stereo sum signal subjected to the high-pass process;

reverse-converting the left channel spectrum to which the stereo sum signal has been added from the frequency domain into the time domain; and reverse-converting the right channel spectrum to which the stereo sum signal has been added from the frequency domain into the time domain.

In a case where the receiving electric-field strength of the FM stereo signal is low and the left and right channel spectra are generated by eliminating the noise component from the stereo difference signal, which has a low SN ratio, and combining the stereo difference signal from which the noise component has been eliminated and the stereo sum signal, grating noise called musical noise may be generated. A listener feels high-frequency-side musical noise grating on his/her ears.

The present aspect subjects the left and right channel spectra thus corrected to the low-pass processes with the low-pass characteristic according to the receiving electric-field strength. This suppresses musical noise. Note, however, that this also causes the left and right channel spectra to become lower in power on the high-frequency sides due to the influence of the low-pass processes, thus reducing the feeling of stereo.

To address this problem, the present aspect subjects the stereo sum signal to the high-pass process with the high-pass characteristic according to the receiving electric-field strength so that the reductions in power on the high-frequency sides of the left and right channel spectra due to the low-pass processes are complemented, and adds, to the left and right channel spectra finished with the low-pass processes, the stereo sum signal subjected to the high-pass process. As a result, the powers on the high-frequency sides reduced by the low-pass processes are complemented. This makes the frequency characteristics of the left and right channel spectra flat, whereby the feeling of stereo is maintained.

Note here that the high-pass process is performed on the stereo sum signal, which is higher in SN ratio than the stereo difference signal. Therefore, the left and right channel spectra, which have become lower in power on the high-frequency sides due to the influence of the low-pass processes, can be complemented with high accuracy. Thus, the present aspect makes it possible to eliminate musical noise without impairing the feeling of stereo.

It should be noted that although the stereo sum signal is not separated into right and left signals and is therefore a monophonic signal, there is no problem as long as the feeling of stereo is maintained on low-frequency sides, as the listener's feeling of stereo is obtuse on the high-frequency sides. The present aspect uses the right and left channel spectra, whose low-frequency sides have been subjected to the low-pass processes, thus achieving a feeling of stereo on the low-frequency sides and making it possible to prevent the listener's feeling of stereo from being impaired.

Furthermore, as with the present aspect, the present aspect generates the expected values of the left and right channel spectra from the left and right channel spectra from which no noise component has been eliminated and corrects the left and right channel spectra so that the left and right channel spectra do not exceed the expected values. As in the first aspect, this restricts the left and right channel spectra from exceeding the expected values and prevents the right and left channel signals from exceeding their original levels.

In the aspect, eliminating the noise component may include eliminating the noise component by a noise suppression amount according to the receiving electric-field strength of the FM stereo signal.

The SN ratio of the stereo difference signal depends on the receiving electric-field strength. The present aspect eliminates the noise component by the noise suppression amount according to the receiving electric-field strength of the FM stereo signal, thus making it possible to eliminate the noise component from the stereo difference signal with high accuracy.

In the aspect, eliminating the noise component may include estimating, from the receiving electric-field strength, a noise spectrum contained in the stereo difference signal thus converted and controlling, on the basis of the noise spectrum thus estimated, the noise suppression amount so that an amount of noise that is contained in the stereo difference signal from which the noise component has been eliminated and an amount of noise that is contained in the stereo sum signal thus converted become equal to each other.

The present aspect eliminates noise from the stereo difference signal so that the amount of noise that is contained in the stereo sum signal and the amount of noise that is contained in the stereo difference signal from which noise has been eliminated become equal to each other. This allows the stereo difference signal from which noise has been eliminated and the stereo sum signal to be substantially equal in amount of noise, thus making it possible to generate the right and left channel spectra while retaining the same SN ratio as the stereo sum signal.

In the aspect, generating the expected values may include generating an absolute value of the left channel spectrum as the expected value of the left channel spectrum and generating an absolute value of the right channel spectrum as the expected value of the right channel spectrum.

The present aspect generates the absolute values of the left and right channel spectra as the expected values, respectively, thus making it possible to accurately generate the expected values.

In the aspect, generating the expected values may include eliminating the noise component from the left channel spectrum by a second noise suppression amount that is smaller than a first noise suppression amount by which the noise component is eliminated from the stereo difference signal thus converted, generating, as the expected value of the left channel spectrum, an absolute value of the left channel spectrum from which the noise component has been eliminated, eliminating the noise component from the right channel spectrum by the second noise suppression amount, and generating, as the expected value of the right channel spectrum, an absolute value of the right channel spectrum from which the noise component has been eliminated.

The present aspect generates the expected values from the absolute values of the left and right channel spectra from which noise has been eliminated, thus making it possible to further accurately generate the expected values. Note here that the noise component has been eliminated from the left and right channel spectra by the second noise suppression amount that is smaller than the first noise suppression amount. This makes it possible to prevent the expected values to be generated from rising due to noise, thus making it possible to more accurately obtain the originally-expected values of the left and right channel spectra.

In the aspect, the adding may include
determining the low-pass characteristic and the high-pass characteristic so that a cut-off frequency becomes lower as the receiving electric-field strength becomes lower, subjecting the left channel spectrum thus corrected to the low-pass process with the low-pass characteristic thus determined, subjecting the right channel spectrum thus corrected to the low-pass process with the low-pass characteristic thus determined, subjecting the stereo sum signal thus converted to the high-pass process with the high-pass characteristic thus determined, adding the stereo sum signal subjected to the high-pass process to the left channel spectrum subjected to the low-pass process, and adding the stereo sum signal subjected to the high-pass process to the right channel spectrum subjected to the low-pass process.

The present aspect embodies components that achieve the process of adding described in the second aspect, this making it possible to accurately achieve the process of adding.

A stereo reproduction apparatus according to a third aspect of the present disclosure is a stereo reproduction apparatus for reproducing an FM stereo signal, the stereo reproduction apparatus including:

a processor; and
a memory storing therein a computer program, which when executed by the processor, causes the processor to perform operations including:

converting a left channel signal contained in the FM stereo signal from a time domain into a frequency domain and outputting a left channel spectrum;

converting a right channel signal contained in the FM stereo signal from a time domain into a frequency domain and outputting a right channel spectrum;

eliminating a noise component from the left channel spectrum;

eliminating a noise component from the right channel spectrum;

generating an addition spectrum by adding the left and right channel spectra;

subjecting the left and right channel spectra from which the noise components have been eliminated to low-pass processes with a low-pass characteristic according to a receiving electric-field strength of the FM stereo signal, subjecting the addition spectrum to a high-pass process with a high-pass characteristic according to the receiving electric-field strength so that reductions in the left and right channel spectra due to the low-pass processes are complemented, and adding, to the left and right channel spectra finished with the low-pass processes, the addition spectrum subjected to the high-pass process;

reverse-converting the left channel spectrum to which the addition spectrum has been added from the frequency domain into the time domain; and reverse-converting the right channel spectrum to which the addition spectrum has been added from the frequency domain into the time domain.

Whereas the stereo reproduction apparatus according to the second aspect employs a stereo difference signal and a stereo sum signal as input signals, the stereo reproduction apparatus according to the third aspect employs left and right channel signals as inputs signals. Moreover, in the stereo reproduction apparatus according to the third aspect, low-pass processes according to a receiving electric-field strength are executed on left and right channel signals from which noise components have been eliminated. Then, a high-pass process according the receiving electric-field strength is executed on an addition spectrum of the left and right channel spectra. The addition spectrum subjected to the high-pass process is added so that reductions in the left and right channel spectra subjected to the low-pass processes are complemented. Therefore, even in the case of employing left and right channel signals as input signals, the stereo reproduction apparatus according to the third aspect can eliminate musical noise without impairing the feeling of stereo, as in the second aspect.

Embodiment 1

Figure 1:
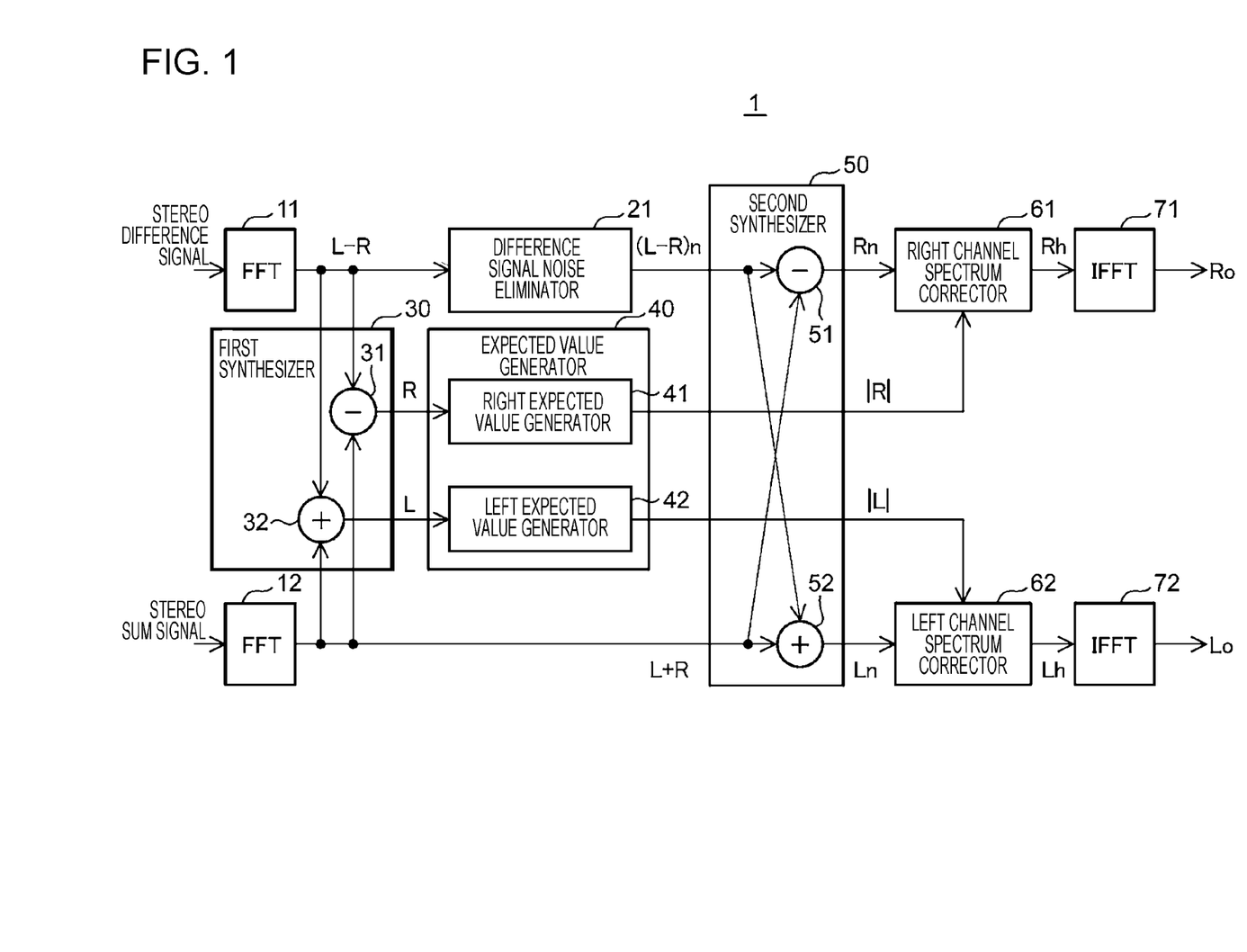
FIG. 1 is a block diagram showing an example of a configuration of a stereo reproduction apparatus according to Embodiment 1 of the present disclosure.

FIG. 1 is a block diagram showing an example of a configuration of a stereo reproduction apparatus 1 according to Embodiment 1 of the present disclosure. The stereo reproduction apparatus 1 is an apparatus for reproducing a digital FM stereo signal. The stereo reproduction apparatus 1 includes converters 11 and 12, a difference signal noise eliminator 21, a first synthesizer 30, an expected value generator 40, a second synthesizer 50, a right channel spectrum corrector 61, a left channel spectrum corrector 62, and reverse converters 71 and 72. The FM stereo signal is constituted by an FM composite signal containing a stereo sum signal and a stereo difference signal. The stereo sum signal and the stereo difference signal are extracted by a preprocessor (not illustrated) from the FM stereo signal, received by an antenna (not illustrated), and then inputted to the converters 12 and 11, respectively.

The converter 11 converts the stereo difference signal from a time domain into a frequency domain. In the following, the stereo difference signal thus converted is referred to as "stereo difference signal L−R". The converter 12 converts the stereo sum signal from a time domain into a frequency domain. In the following, the stereo sum signal thus converted is referred to as "stereo sum signal L+R". The converters 11 and 12 need only generate the stereo difference signal L−R and the stereo sum signal L+R through fast Fourier transforms (FFTs), respectively. It should be noted that the converter 11 corresponds to an example of the second converter and the converter 12 corresponds to an example of the first converter.

The difference signal noise eliminator 21 eliminates a noise component from the stereo difference signal L−R. As shown in FIG. 8, a noise spectrum tends to increase with increase in frequency and becomes larger in inclination with decrease in receiving electric-field strength S of the FM stereo signal. Further, in the bandwidth of the stereo difference signal L−R (i.e. a bandwidth of 23 kHz to 53 kHz), the noise spectrum according to the receiving electric-field strength S can be grasped in advance.

Accordingly, the difference signal noise eliminator 21 includes a noise map storing the noise spectrum according to the receiving electric-field strength S in advance therein and uses this noise map to estimate the noise spectrum. Moreover, the difference signal noise eliminator 21 eliminates the noise component from the stereo difference signal L−R by subtracting, from the stereo difference signal L−R, the noise spectrum thus estimated.

The receiving electric-field strength S is usually obtained by measuring the strength of a signal that is yet to be FM-demodulated. Note here that the noise component of the stereo difference signal L−R is eliminated because, in the AM-FM scheme FM stereo composite signal of FIG. 8, the stereo difference signal L−R is located in a higher frequency band than the stereo sum signal L+R and poorer in SN ratio than the stereo sum signal L+R. Further, the technique by which the difference signal noise eliminator 21 eliminates noise is non-linear processing, as it is a process of subtracting the noise spectrum from the stereo difference signal L−R and falls under the category of spectral subtraction methods.

The first synthesizer 30 generates a left channel spectrum L and a right channel spectrum R by combining the stereo difference signal L−R outputted from the converter 11 and the stereo sum signal L+R outputted from the converter 12.

Note here that the first synthesizer 30 includes a subtracter 31 and an adder 32. The subtracter 31 generates the right channel spectrum R by subtracting the stereo sum signal L+R from the stereo difference signal L−R and reducing the power to half. The adder 32 generates the left channel spectrum L by adding the stereo difference signal L−R and the stereo sum signal L+R and reducing the power to half.

The expected value generator 40 includes a right expected value generator 41 and a left expected value generator 42. The right expected value generator 41 generates an expected value |R| of the right channel spectrum R from the right channel spectrum R. The left expected value generator 42 generates an expected value |L| of the left channel spectrum L from the left channel spectrum L.

Note here that the absolute values of the right and left channel spectra R and L can be employed as the expected values |R| and |L|, respectively. The right and left channel spectra R and L are each expressed by a mathematical expression in which a real component and an imaginary component are linearly combined. Accordingly, the absolute value |R| can be obtained by multiplying, by ½, the sum of the square of the coefficient of the real component of the right channel spectrum R and the square of the coefficient of the imaginary component of the right channel spectrum R. The absolute value |L| can be obtained by a calculation which is similar to that by which the absolute value |R| is obtained.

The second synthesizer 50 generates right and left channel spectra Rn and Ln by combining a stereo difference signal (L−R)n from which a noise component has been eliminated by the difference signal noise eliminator 21 and the stereo sum signal L+R. Note here that the second synthesizer 50 includes a subtracter 51 and an adder 52.

The subtracter 51 generates the right channel spectrum Rn by subtracting the stereo sum signal L+R from the stereo difference signal (L−R)n and reducing the power to half. The adder 52 generates the left channel spectrum Ln by adding the stereo sum signal L+R and the stereo difference signal (L−R)n and reducing the power to half.

Note here that the right and left channel spectra Rn and Ln are ones calculated on the basis of the stereo difference signal (L−R)n from which the noise component has been eliminated. Meanwhile, the right and left channel spectra R and L generated by the first synthesizer 30 are ones calculated on the basis of the stereo difference signal L−R from which the noise component is yet to be eliminated. For the sake of quick identification, the right and left channel spectra outputted from the second synthesizer 50 are given the signs "Rn" and "Ln", respectively.

The right channel spectrum corrector 61 so corrects the right channel spectrum Rn outputted from the second synthesizer 50 that the right channel spectrum Rn does not exceed the expected value |R|.

The left channel spectrum corrector 62 so corrects the left channel spectrum Ln outputted from the second synthesizer 50 that the left channel spectrum Ln does not exceed the expected value |L|.

Note here that the right channel spectrum corrector 61 needs only correct the right channel spectrum Rn by extracting, from the right channel spectrum Rn, a frequency component that exceeds the expected value |R| and limiting the power of the extracted frequency component to the expected value |R|. The left channel spectrum corrector 62 needs only correct the left channel spectrum Ln by performing an operation which is similar to that which the right channel spectrum corrector 61 performs.

The reverse converter 71 generates a right channel signal Ro by reverse-converting a right channel spectrum Rh outputted from the right channel spectrum corrector 61 from the frequency domain into the time domain. The reverse converter 72 generates a left channel signal Lo by reverse-converting a left channel spectrum Lh outputted from the left channel spectrum corrector 62 from the frequency domain into the time domain. Note here that the reverse converters 71 and 72 need only generate the right and left channel signals Ro and Lo by performing inverse fast Fourier transforms (IFFTs), respectively.

Figure 7:
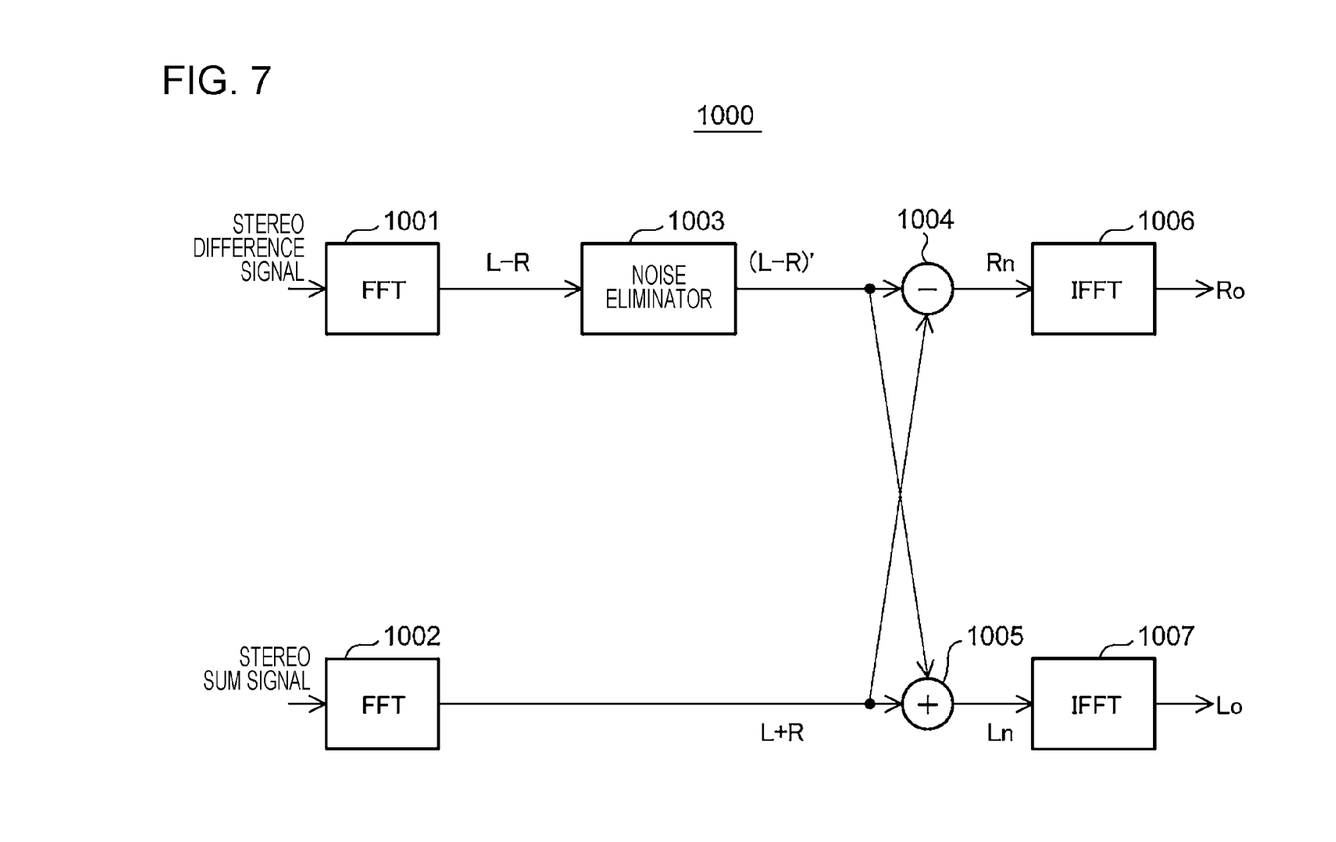
FIG. 7 is a diagram showing an example of a configuration of a stereo reproduction apparatus according to a comparative example of the stereo reproduction apparatus according to Embodiment 1.

FIG. 7 is a diagram showing an example of a configuration of a stereo reproduction apparatus 1000 according to a comparative example of the stereo reproduction apparatus 1 according to Embodiment 1.

In the stereo reproduction apparatus 1000, a converter 1001 converts a stereo difference signal into a frequency domain to generate a stereo difference signal L−R, and a converter 1002 converts a stereo sum signal into a frequency domain to generate a stereo sum signal L+R. Then, a noise eliminator 1003 eliminates a noise component from the stereo difference signal L−R by using a spectral subtraction method. A subtracter 1004 generates a right channel spectrum Rn by subtracting the stereo sum signal L+R from a stereo difference signal (L−R)' from which the noise component has been eliminated and reducing the power to half. An adder 1005 generates a left channel spectrum Ln by adding the stereo sum signal L+R and the stereo difference signal (L−R)' and reducing the power to half. Then, a reverse converter 1006 generates a right channel signal Ro by reverse-converting the right channel spectrum Rn, and a reverse converter 1007 generates a left channel signal Lo by reverse-converting the left channel spectrum Ln.

Thus, in the stereo reproduction apparatus 1000, the right and left channel spectra Rn and Ln are generated on the basis of the stereo difference signal (L−R)'. Accordingly, in a case where the receiving electric-field strength S is low and the stereo difference signal (L−R)' has a low SN ratio, the noise elimination effect of the noise eliminator 1003 may affect a signal component of the stereo difference signal L−R.

Therefore, in a case where the right channel spectrum Rn is generated by subtracting the stereo sum signal L+R from the stereo difference signal (L−R)', the left channel spectrum Ln remains without being successfully canceled out, and the remaining left channel spectrum AL is added to the right channel spectrum Rn, with the result that the power of the right channel spectrum Rn may become higher than the original power. Further, also in a case where the left channel spectrum Ln is generated by adding the stereo difference signal (L−R)' and the stereo sum signal L+R, the level of the left channel spectrum Ln may become higher than the original level for a similar reason.

To address this problem, the stereo reproduction apparatus 1 shown in FIG. 1 generates the expected values |R| and |L| from the right and left channel spectra R and L, respectively, generated on the basis of the stereo difference signal L−R from which noise is yet to be eliminated. Then, the right and left channel spectra Rn and Ln generated on the basis of the stereo difference signal (L−R)n from which noise has been eliminated are corrected so as not to exceed the expected values |R| and |L|, respectively. This prevents the right and left channel signals Ro and Lo from exceeding their original levels and makes it possible to suppress deterioration in separation and sound quality even under a situation where the receiving electric-field strength S is low.

Embodiment 2

Figure 2:
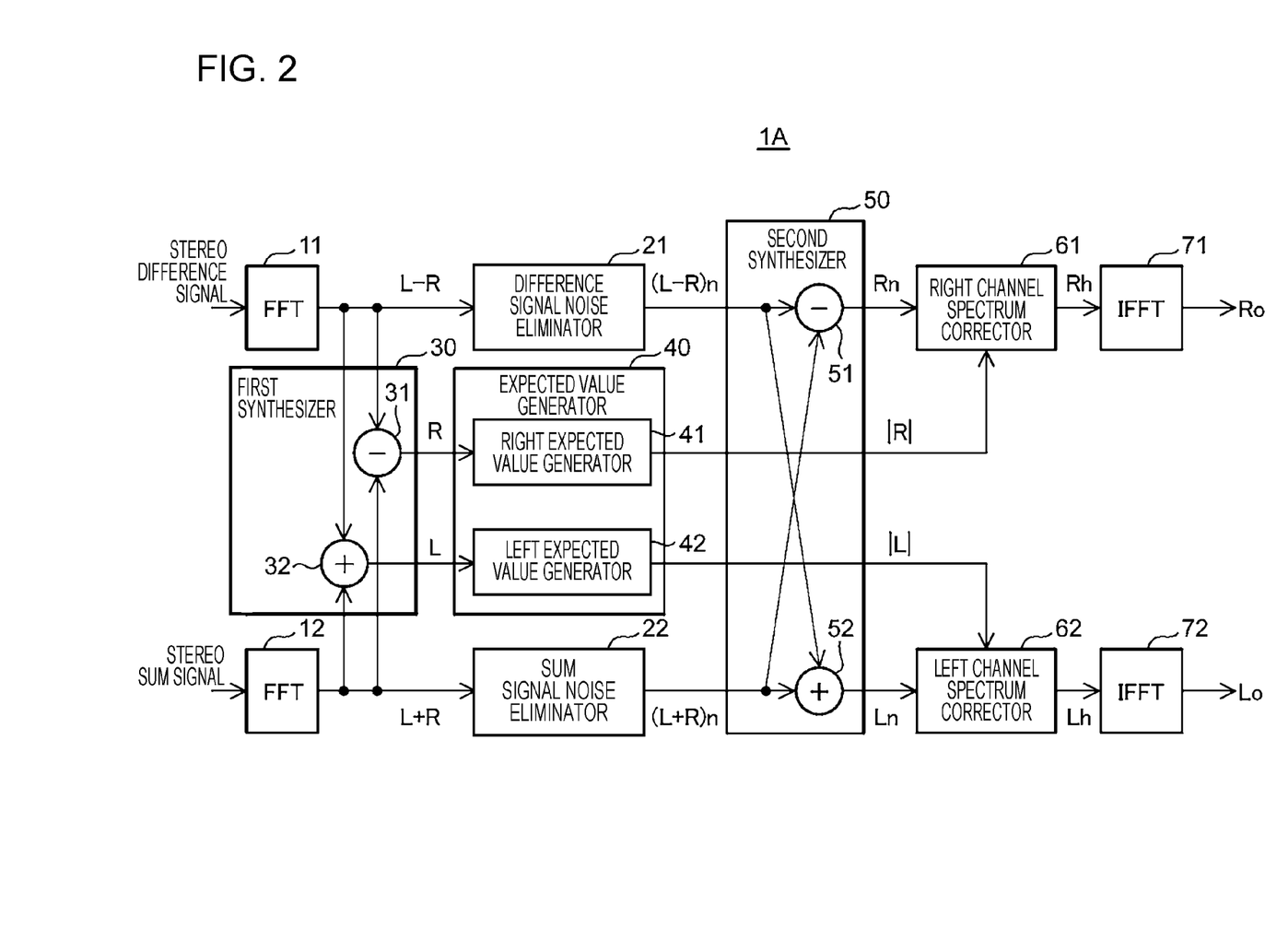
FIG. 2 is a block diagram showing an example of a configuration of a stereo reproduction apparatus according to Embodiment 2 of the present disclosure.

FIG. 2 is a block diagram showing an example of a configuration of a stereo reproduction apparatus 1A according to Embodiment 2 of the present disclosure. In comparison with the stereo reproduction apparatus 1, the stereo reproduction apparatus 1A further includes a sum signal noise eliminator 22. The sum signal noise eliminator 22 eliminates a noise component from the stereo sum signal L+R. As shown in FIG. 8, in the bandwidth of the stereo sum signal L+R (i.e. a bandwidth of up to 15 kHz), the noise spectrum according to the receiving electric-field strength S can be grasped in advance.

Accordingly, as with the difference signal noise eliminator 21, the sum signal noise eliminator 22 includes a noise map storing the noise spectrum according to the receiving electric-field strength S in advance therein and uses this noise map to estimate the noise spectrum. Moreover, the sum signal noise eliminator 22 eliminates the noise component from the stereo sum signal L+R by subtracting, from the stereo sum signal L+R, the noise spectrum thus estimated.

The second synthesizer 50 generates right and left channel spectra Rn and Ln by using a stereo difference signal (L−R)n from which a noise component has been eliminated and a stereo sum signal (L+R)n from which the noise component has been eliminated.

Thus, in the stereo reproduction apparatus 1A, the right and left channel spectra Rn and Ln can be obtained with more noise components eliminated, as the noise component has been eliminated from the stereo sum signal L+R.

In Embodiment 2, the stereo sum signal L+R, as well as the stereo difference signal L−R, has its noise component eliminated by non-linear processing, both of the signals may have their signal components distorted if the receiving electric-field strength S is low. In this case, as in Embodiment 1, the right and left channel spectra Rn and Ln may become higher than their original powers.

To address this problem, as with the stereo reproduction apparatus 1, the stereo reproduction apparatus 1A limits the right and left channel spectra Rn and Ln so that the right and left channel spectra Rn and Ln do not exceed the expected values |R| and |L|, respectively. This allows the stereo reproduction apparatus 1A to bring about effects which are similar to those which the stereo reproduction apparatus 1 brings about.

Embodiment 3

Figure 3:
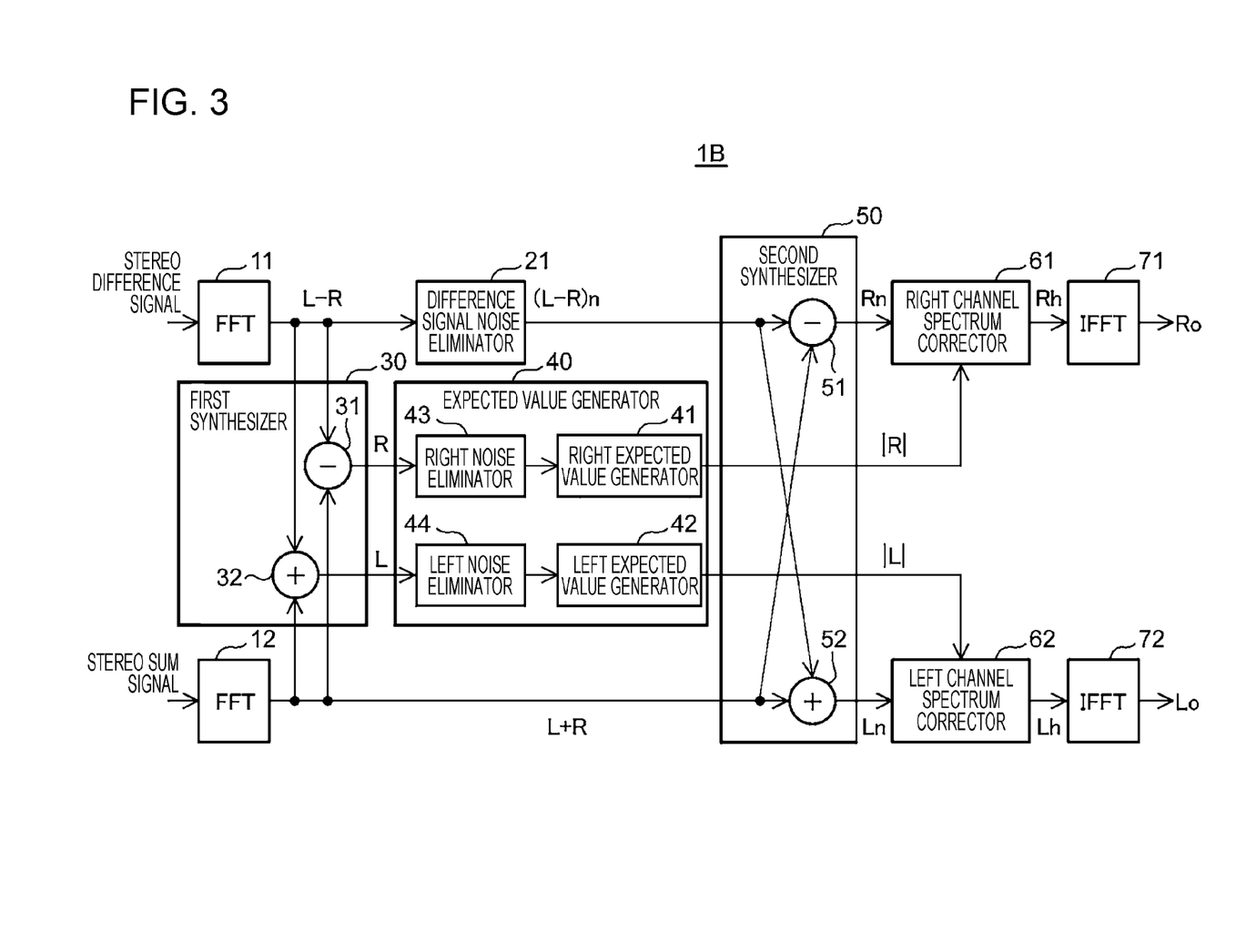
FIG. 3 is a block diagram showing an example of a configuration of a stereo reproduction apparatus according to Embodiment 3 of the present disclosure.

FIG. 3 is a block diagram showing an example of a configuration of a stereo reproduction apparatus 1B according to Embodiment 3 of the present disclosure. The stereo reproduction apparatus 1B includes an expected value generator 40 which is difference in configuration from that of the stereo reproduction apparatus 1.

That is, the expected value generator 40 further includes a right noise eliminator 43 and a left noise eliminator 44. The right noise eliminator 43 eliminates a noise component from the right channel spectrum R outputted from the first synthesizer 30. The left noise eliminator 44 eliminates a noise component from the left channel spectrum L outputted from the first synthesizer 30.

Note here that the right and left noise eliminators 43 and 44 eliminate the noise components by a second noise suppression amount that is smaller than a first noise suppression amount that is the noise suppression amount of the difference signal noise eliminator 21. Such a predetermined noise suppression amount (e.g. 6 dB) that does not affect signal components of the right and left channel spectra R and L can be employed as the second noise suppression amount.

Thus, the stereo reproduction apparatus 1B calculates the expected values |R| and |L| from the right and left channel spectra R and L from which the noise components haven been eliminated, respectively, and can therefore calculate the expected values |R| and |L| with high accuracy.

Embodiment 4

Figure 4:
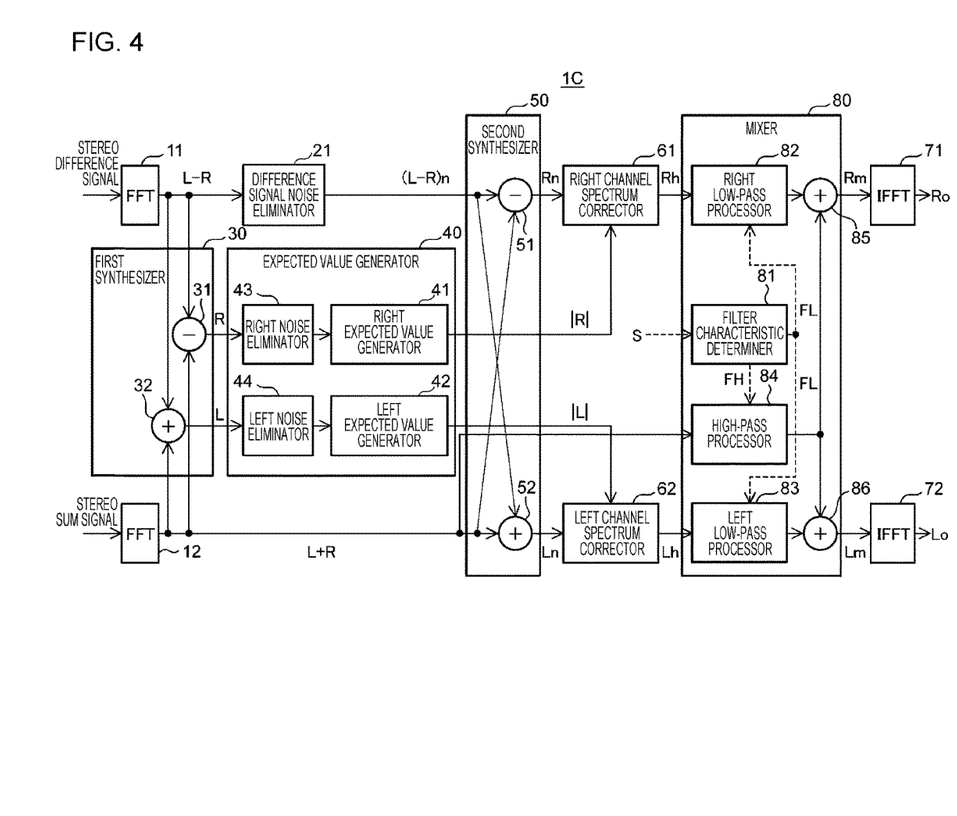
FIG. 4 is a block diagram showing an example of a configuration of a stereo reproduction apparatus according to Embodiment 4 of the present disclosure.

FIG. 4 is a block diagram showing an example of a configuration of a stereo reproduction apparatus 10 according to Embodiment 4 of the present disclosure. In comparison with the stereo reproduction apparatus 1B, the stereo reproduction apparatus 10 further includes a mixer 80.

The mixer 80 includes a filter characteristic determiner 81, a right low-pass processor 82, a left low-pass processor 83, a high-pass processor 84, an adder 85 (which is an example of the right adder), and an adder 86 (which is an example of the left adder).

The filter characteristic determiner 81 determines a low-pass characteristic and a high-pass characteristic so that the cut-off frequency becomes lower as the receiving electric-field strength S becomes lower.

Figure 5A:
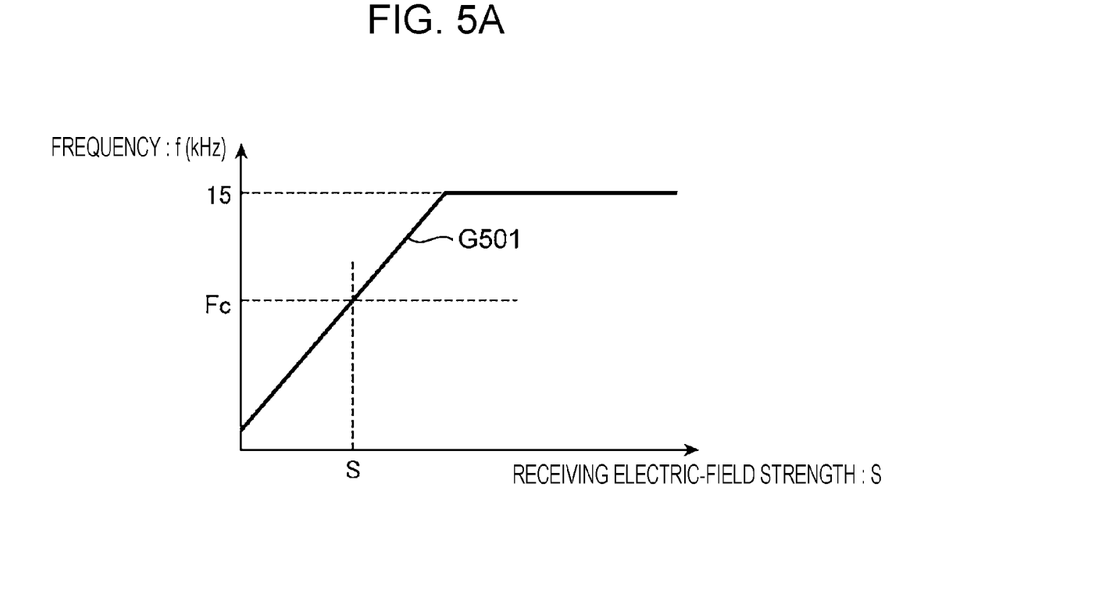
FIG. 5A is a graph showing a cut-off characteristic indicating a relationship between the receiving electric-field strength and the cut-off frequency.

FIG. 5A is a graph showing a cut-off characteristic G501 indicating a relationship between the receiving electric-field strength S and the cut-off frequency Fc. The vertical axis represents the frequency f (kHz), and the horizontal axis represents the receiving electric-field strength S. In the cut-off characteristic G501 shown in FIG. 5A, the cut-off frequency Fc linearly increases at a constant inclination as the receiving electric-field strength S increases, and once the cut-off frequency Fc reaches 15 kHz, the cut-off frequency Fc is maintained at 15 kHz as the receiving electric-field strength S increases. It should be noted that 15 kHz corresponds to the upper limit of the bandwidth of the stereo sum signal L+R shown in FIG. 8.

The filter characteristic determiner 81 stores in advance therein the cut-off characteristic G501 shown in FIG. 5A and, with reference to the cut-off characteristic G501, determines the cut-off frequency Fc corresponding to the current receiving electric-field strength S.

Note here that the cut-off frequency Fc increases as the receiving electric-field strength S increases because a high-frequency-side bandwidth occupied by musical noise of a certain power or higher increases as the receiving electric-field strength S becomes lower.

Figure 5B:
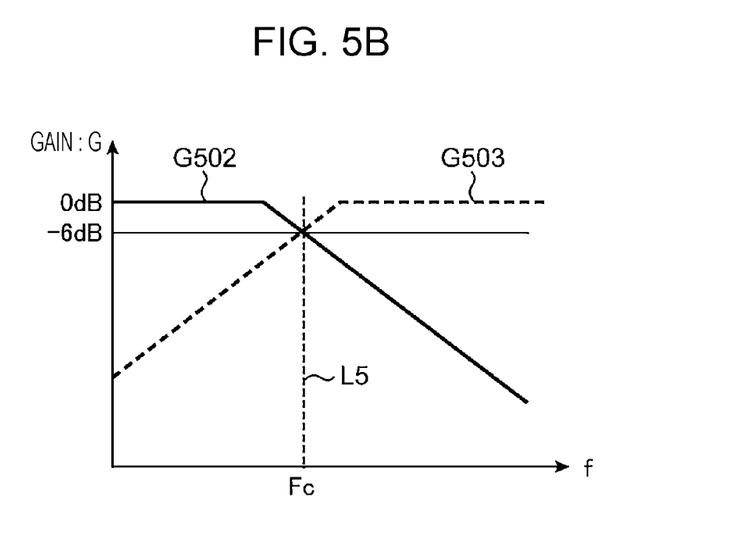
FIG. 5B is a graph showing a low-pass filter and a high-pass filter.

Moreover, the filter characteristic determiner 81 determines a low-pass filter having a low-pass characteristic corresponding to the cut-off frequency Fc and a high-pass filter having a high-pass characteristic corresponding to the cut-off frequency Fc. FIG. 5B is a graph showing a low-pass filter G502 and a high-pass filter G503. The vertical axis represents the gain (dB), and the horizontal axis represents the frequency. The low-pass filter G502 and the high-pass filter G503 are shaped to have line symmetry with respect to a straight line L5 passing through the cut-off frequency Fc.

Specifically, the low-pass filter G502 has such a low-pass characteristic that the gain linearly increases at a constant inclination with decrease in frequency so that the gain passes through the cut-off frequency Fc when the gain is −6 dB, and once the gain reaches 0 dB, the gain is maintained at 0 dB with decrease in frequency.

Further, the high-pass filter G503 has such a high-pass characteristic that the gain linearly increases at a constant inclination with increase in frequency so that the gain passes through the cut-off frequency Fc when the gain is −6 dB, and once the gain reaches 0 dB, the gain is maintained at 0 dB with increase in frequency.

That is, the low-pass filter G502 and the high-pass filter G503 complement each other to have such characteristics that the gain is maintained substantially at 0 dB throughout the entire bandwidth.

The low-pass filter G502 and the high-pass filter G503 do not change in inclination even with a change in the cut-off frequency Fc. Accordingly, the low-pass filter G502 and the high-pass filter G503 are shifted leftward overall with decrease in the cut-off frequency Fc and shifted rightward overall with increase in the cut-off frequency Fc.

Note here that the filter characteristic determiner 81 includes a filter map in which a filter coefficient FL according to the cut-off frequency Fc that defines the low-pass filter G502 and a filter coefficient FH according to the cut-off frequency Fc that defines the high-pass filter G503 are stored in advance.

Accordingly, the filter characteristic determiner 81 determines the filter coefficient FL according to the cut-off frequency Fc with reference to the filter map and outputs the filter coefficient FL thus determined to the right low-pass processor 82 and the left low-pass processor 83.

Further, the filter characteristic determiner 81 determines the filter coefficient FH according to the cut-off frequency Fc with reference to the filter map and outputs the filter coefficient FH thus determined to the high-pass processor 84.

Continued reference is made to FIG. 4. The right low-pass processor 82 performs a low-pass process of attenuating, with the filter coefficient FL determined by the filter characteristic determiner 81, a high-frequency side of the right channel spectrum Rh corrected by the right channel spectrum corrector 61.

The left low-pass processor 83 performs a low-pass process of attenuating, with the filter coefficient FL determined by the filter characteristic determiner 81, a high-frequency side of the left channel spectrum Lh corrected by the left channel spectrum corrector 62.

This makes it possible eliminate, from musical noise contained in the right and left channel spectra Rh and Lh, musical noise distributed on the high-frequency sides that grates on the listener's ears.

However, this also causes the right and left channel spectra Rh and Lh to become lower in power on the high-frequency sides due to the influence of the low-pass processes, thus reducing the feeling of stereo.

To address this problem, Embodiment 4 provides the high-pass processor 84 and the adders 85 and 86. The high-pass processor 84 subjects the stereo sum signal L+R to a high-pass process with the filter coefficient FH determined by the filter characteristic determiner 81.

The adder 85 generates a right complementary spectrum Rm by adding, to the right channel spectrum Rh outputted from the right low-pass processor 82, the stereo sum signal L+R subjected to the high-pass process by the high-pass processor 84.

The adder 86 generates a left complementary spectrum Lm by adding, to the left channel spectrum Lh outputted from the left low-pass processor 83, the stereo sum signal L+R subjected to the high-pass process by the high-pass processor 84.

This allows the stereo sum signal L+R to be subjected to the high-pass process with a high-pass characteristic according to the receiving electric-field strength S so that the reductions in power on the high-frequency sides of the right and left channel spectra Rh and Lh due to the low-pass processes are complemented. Moreover, the stereo sum signal L+R subjected to the high-pass process is added to the right and left channel spectra Rh and Lh finished with the low-pass processes. As a result, the powers on the high-frequency sides reduced by the low-pass processes are complemented. This makes the frequency characteristics of the left and right channel spectra flat, whereby the feeling of stereo is maintained.

Note here that the high-pass process is performed on the stereo sum signal L+R, which is higher in SN ratio than the stereo difference signal L−R. Therefore, the left and right channel spectra Rh and Lh, which have become lower in power on the high-frequency sides due to the influence of the low-pass processes, can be complemented with high accuracy.

It should be noted that although the stereo sum signal L+R is not separated into right and left signals and is therefore a monophonic signal, there is no problem as long as the feeling of stereo is maintained on low-frequency sides, as the listener's feeling of stereo is obtuse on the high-frequency sides. Embodiment 4 uses the right and left channel spectra Rh and Lh, whose low-frequency sides have been subjected to the low-pass processes, thus achieving a feeling of stereo on the low-frequency sides and making it possible to prevent the listener's feeling of stereo from being impaired.

The reverse converter 71 generates a right channel signal Ro by reverse-converting the right complementary spectrum Rm from the frequency domain into the time domain.

The reverse converter 72 generates a left channel signal Lo by reverse-converting the left complementary spectrum Lm from the frequency domain into the time domain.

As described above, the stereo reproduction apparatus 10 adds, to the right channel spectra Rh and Lh subjected to the low-pass processes, the stereo sum signal L+R subjected to the high-pass process. This makes it possible to eliminate musical noise without impairing the feeling of stereo.

It should be noted that, in Embodiment 4, as in Embodiment 1, the absolute values |R| and |L| put limits on increases in the right and left channel spectra Rn and Ln due to distortions of signal components, respectively. This allows deterioration in sound quality to be suppressed and also achieves suppression of musical noise.

Embodiment 5

Figure 6:
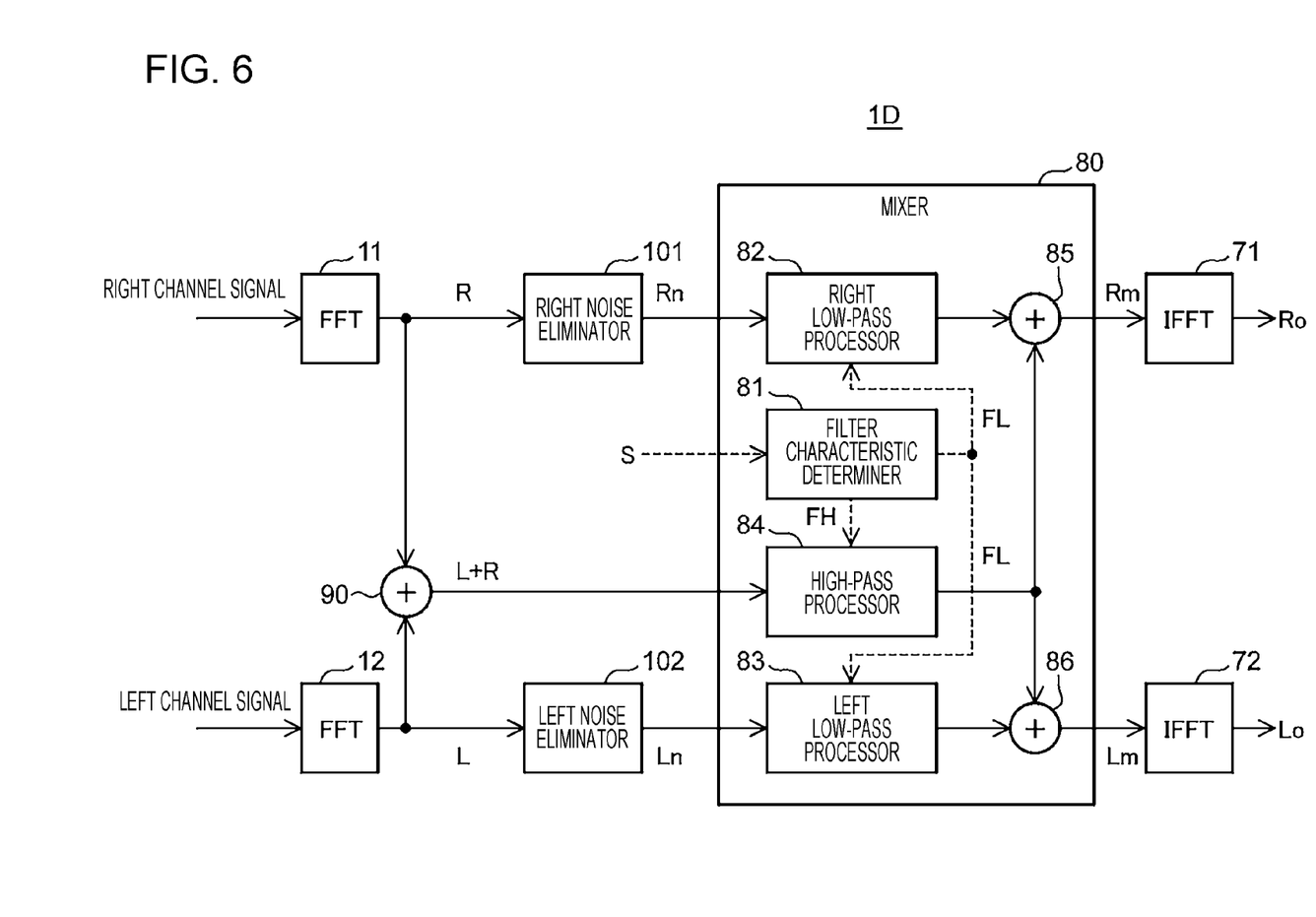
FIG. 6 is a block diagram showing an example of a configuration of a stereo reproduction apparatus according to Embodiment 5 of the present disclosure.

FIG. 6 is a block diagram showing an example of a configuration of a stereo reproduction apparatus 1D according to Embodiment 5 of the present disclosure. The stereo reproduction apparatus 1D differs from the stereo reproduction apparatus 10 in that the stereo reproduction apparatus 1D receives right and left channel signals instead of receiving a stereo difference signal and a stereo sum signal.

That is, as the right and left channel signals that the stereo reproduction apparatus 1D receives are separated from each other in advance, the stereo reproduction apparatus 1D does not need to generate right and left channel spectra R and L by combining a stereo difference signal (L−R)n and a stereo sum signal L+R from which noise components have been eliminated. Therefore, unlike the stereo reproduction apparatus 1, the stereo reproduction apparatus 1D does not suffer from such a problem that the right and left channel spectra R and L become higher than their original powers.

Therefore, the stereo reproduction apparatus 1D omits to include the components involved in the solution of this problem, namely the first synthesizer 30, the expected value generator 40, the second synthesizer 50, and the right and left channel spectrum correctors 61 and 62.

Instead of including these components, the stereo reproduction apparatus 1D includes right and left noise eliminators 101 and 102 and an adder 90 in place of the difference signal noise eliminator 21.

The right and left channel signals are separated from each other in advance by a preprocessor (not illustrated) and inputted to the converters 11 and 12, respectively.

The converter 11 generates a right channel spectrum R by converting the right channel signal from a time domain into a frequency domain. The converter 12 generates a left channel spectrum L by converting the left channel signal from a time domain into a frequency domain.

The right noise eliminator 101 eliminates a noise component from the right channel spectrum R. The left noise eliminator 102 eliminates a noise component from the left channel spectrum L. Note here that, as with the difference signal noise eliminator 21, the right and left noise eliminators 101 and 102 need only eliminate the noise components by using noise maps in which noise spectrums according to the receiving electric-field strength S are stored in advance.

The adder 90 adds the right channel spectrum R and the left channel spectrum L and outputs an addition spectrum L+R to the high-pass processor 84.

The mixer 80 is basically the same in configuration as that of the stereo reproduction apparatus 10. Note, however, that the mixer 80 differs in configuration from the mixer 80 of the stereo reproduction apparatus 10 in that the right low-pass processor 82 receives a right channel spectrum Rn from which the noise component has been eliminated, that the left low-pass processor 83 receives a left channel spectrum Ln from which the noise component has been eliminated, and that the high-pass processor 84 receives the addition spectrum L+R.

Specifically, the right low-pass processor 82 performs a low-pass process on the right channel spectrum Rn with the filter coefficient FL. The left low-pass processor 83 performs a low-pass process on the left channel spectrum Ln with the filter coefficient FL. The high-pass processor 84 performs a high-pass process on the addition spectrum L+R with the filter coefficient FH.

Processes in the adders 85 and 86 are the same as those in the adders 85 and 86 of the stereo reproduction apparatus 10 and, as such, are not described here.

In the stereo reproduction apparatus 1D, the noise components are eliminated from the right and left channel spectra R and L by non-linear processing. Therefore, under a situation where the receiving electric-field strength S is low and the SN ratio is low, signal components contained in the right and left channel spectra R and L become distorted, with the result that the aforementioned musical noise may be generated.

To address this problem, the stereo reproduction apparatus 1D eliminates musical noise by performing low-pass processes on the right and left channel spectra Rn and Ln with a low-pass characteristic according to the receiving electric-field strength S. Note, however, that this may cause the right and left channel spectra Rn and Ln to become lower in power on the high-frequency sides, thus reducing the feeling of stereo. To address this problem, the stereo reproduction apparatus 1D performs a high-pass process on the addition spectrum L+R, from which no noise has been eliminated, with a high-pass characteristic according to the receiving electric-field strength S and adds the addition spectrum L+R to the right and left channel spectra Rn and Ln finished with the low-pass processes. This allows the stereo reproduction apparatus 1D to complement the reductions in power on the high-frequency sides due to the low-pass processes and eliminate musical noise without impairing the feeling of stereo.

Modification 1

In Embodiment 1, the difference signal noise eliminator 21 may eliminate a noise component from the stereo difference signal L−R so that the amount of noise in the stereo difference signal (L−R)n from which noise has been eliminated and the amount of noise in the stereo sun signal L+R are equal to each other.

The noise spectrum contained in the stereo difference signal L−R has such a characteristic as to be higher overall than the noise spectrum contained in the stereo sum signal L+R by about a predetermined noise difference level (e.g. 26 dB).

Given these circumstances, the difference signal noise eliminator 21 obtains an SN ratio for each frequency component of the stereo difference signal L−R by comparing the stereo difference signal L−R with the noise spectrum estimated from the receiving electric-field strength S. Then, under such a limit that the maximum noise suppression amount is set at the noise difference level, the difference signal noise eliminator 21 calculates noise suppression amounts for each separate frequency components so that a frequency component with a lower SN ratio has a larger noise suppression amount. For example, the difference signal noise eliminator 21 needs only calculate a noise suppression amount for each noise component by multiplying the noise difference level by the percentage of noise in each frequency component.

Then, the difference signal noise eliminator 21 eliminates the noise component from the stereo difference signal L−R by attenuating the stereo difference signal L−R by noise suppression amounts calculated for each separate frequency components.

This allows the stereo difference signal (L−R)n from which noise has been eliminated and the stereo sum signal L+R to be substantially equal in amount of noise, whereby the right and left channel spectra R and L can be generated with the same SN ratio as the stereo sum signal L+R.

Modification 2

Although not particularly mentioned in the foregoing description, the stereo reproduction apparatuses 1 to 1D may be on-vehicle stereo reproduction apparatuses that are mounted on vehicles. As vehicles move at high speeds, there is a high possibility that, in on-vehicle environments, the receiving electric-field strength S is in a continuous state of change and the SN ratio becomes lower. Therefore, the stereo reproduction apparatuses 1 to 1D are useful in on-vehicle environments.

A stereo reproduction apparatus of the present disclosure can suppress deterioration in separation and sound quality even under a situation with a low receiving electric-field strength and is therefore useful as an on-vehicle stereo reproduction apparatus.

What is claimed is:

1. A stereo reproduction apparatus for reproducing an FM stereo signal containing a stereo sum signal and a stereo difference signal, the stereo reproduction apparatus comprising:
   a processor; and
   a memory storing a computer program, which when executed by the processor, causes the processor to perform operations including:
   converting the stereo sum signal from a time domain into a frequency domain;
   converting the stereo difference signal from the time domain into the frequency domain;
   eliminating a noise component from the converted stereo difference signal;
   combining the converted stereo sum signal and the converted stereo difference signal to output left channel spectrum and right channel spectrum;
   generating left channel expected value from the left channel spectrum and right channel expected value from the right channel spectrum;
   combining the converted stereo sum signal and the converted stereo difference signal from which the noise component has been eliminated to output (i) the left channel spectrum from which the noise component has been eliminated and (ii) the right channel spectrum from which the noise component has been eliminated;
   correcting the left channel spectrum from which the noise component has been eliminated so as not to exceed the left channel expected value;
   correcting the right channel spectrum from which the noise component has been eliminated so as not to exceed the right channel expected value;
   reverse-converting the corrected left channel spectrum from the frequency domain into the time domain; and
   reverse-converting the corrected right channel spectrum from the frequency domain into the time domain.

2. A stereo reproduction apparatus for reproducing an FM stereo signal containing a stereo sum signal and a stereo difference signal, the stereo reproduction apparatus comprising:
   a processor; and
   a memory storing a computer program, which when executed by the processor, causes the processor to perform operations including:
   converting the stereo sum signal from a time domain into a frequency domain;
   converting the stereo difference signal from the time domain into the frequency domain;
   eliminating a noise component from the converted stereo difference signal;
   combining the converted stereo sum signal and the converted stereo difference signal to output left channel spectrum and right channel spectrum;
   generating left channel expected value from the left channel spectrum and right channel expected value from the right channel spectrum;
   combining the converted stereo sum signal and the converted stereo difference signal from which the noise component has been eliminated to output (i) the left channel spectrum from which the noise component has been eliminated and (ii) the right channel spectrum from which the noise component has been eliminated;

correcting the left channel spectrum from which the noise component has been eliminated so as not to exceed the left channel expected value;

correcting the right channel spectrum from which the noise component has been eliminated so as not to exceed the right channel expected value;

low-pass processing the corrected left channel spectrum and the corrected right channel spectrum by a low-pass characteristic according to a receiving electric-field strength of the FM stereo signal;

high-pass processing the converted stereo sum signal by a high-pass characteristic according to the receiving electric-field strength so as to compensate a reduction of the left channel spectrum and a reduction of the right channel spectrum by the low-pass processing;

adding the high-pass processed stereo sum signal to the low-pass processed left channel spectrum and the low-pass processed right channel spectrum;

reverse-converting the added left channel spectrum from the frequency domain into the time domain; and reverse-converting the added right channel spectrum from the frequency domain into the time domain.

3. The stereo reproduction apparatus according to claim 1 or 2, wherein, in the eliminating, the noise component is eliminated from the converted stereo difference signal by a noise suppression amount according to the receiving electric-field strength of the FM stereo signal.

4. The stereo reproduction apparatus according to claim 3, wherein eliminating of the noise component includes, estimating, from the receiving electric-field strength, a noise spectrum contained in the converted stereo difference signal, and controlling, on the basis of the estimated noise spectrum, the noise suppression amount so that an amount of noise that is contained in the stereo difference signal from which the noise component has been eliminated and an amount of noise that is contained in the converted stereo sum signal become equal to each other.

5. The stereo reproduction apparatus according to claim 1 or 2, wherein generating of the expected values includes, generating an absolute value of the left channel spectrum as the left channel expected value, and generating an absolute value of the right channel spectrum as the right channel expected value.

6. The stereo reproduction apparatus according to claim 1 or 2, wherein generating of the expected values includes, eliminating the noise component from the left channel spectrum by a second noise suppression amount that is smaller than a first noise suppression amount by which the noise component is eliminated from the converted stereo difference signal, generating, as the left channel expected value, an absolute value of the left channel spectrum from which the noise component has been eliminated, eliminating the noise component from the right channel spectrum by the second noise suppression amount, and generating, as the right channel expected value, an absolute value of the right channel spectrum from which the noise component has been eliminated.

7. The stereo reproduction apparatus according to claim 2, wherein the adding includes, determining the low-pass characteristic and the high-pass characteristic so that a cut-off frequency becomes lower as the receiving electric-field strength becomes lower, low-pass processing the corrected left channel spectrum by the determined low-pass characteristic, low-pass processing the corrected right channel spectrum by the determined low-pass characteristic, high-pass processing the converted stereo sum signal by the determined high-pass characteristic, adding the high-pass processed stereo sum signal to the low-pass processed left channel spectrum, and adding the high-pass processed stereo sum signal to the low-pass processed right channel spectrum.

8. A stereo reproduction apparatus for reproducing an FM stereo signal, the stereo reproduction apparatus comprising:

a processor; and a memory storing a computer program, which when executed by the processor, causes the processor to perform operations including:

converting a left channel signal contained in the FM stereo signal from a time domain into a frequency domain and outputting a left channel spectrum;

converting a right channel signal contained in the FM stereo signal from the time domain into the frequency domain and outputting a right channel spectrum;

eliminating a noise component from the left channel spectrum;

eliminating a noise component from the right channel spectrum;

generating an addition spectrum by adding the left channel spectrum and right the right channel spectrum;

low-pass processing the left channel spectrum from which the noise components have been eliminated and the right channel spectrum by a low-pass characteristic according to a receiving electric-field strength of the FM stereo signal;

high-pass processing the addition spectrum by a high-pass characteristic according to the receiving electric-field strength so as to compensate a reduction of the left channel spectrum due to the low-pass processes and a reduction of the right channel spectrum due to the low-pass processes;

adding the high-pass processed addition spectrum to the low-pass processed left channel spectrum and the low-pass processed right channel spectrum;

reverse-converting the added left channel spectrum from the frequency domain into the time domain; and reverse-converting the added right channel spectrum from the frequency domain into the time domain.

* * * * *